(12) United States Patent
Friesen (10) Patent No.: US 8,164,082 B2
(45) Date of Patent: Apr. 24, 2012

(54) SPIN-BUS FOR INFORMATION TRANSFER IN QUANTUM COMPUTING

(75) Inventor: Mark G. Friesen, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1602 days.

(21) Appl. No.: 11/528,717

(22) Filed: Sep. 27, 2006

(65) Prior Publication Data

US 2010/0241780 A1    Sep. 23, 2010

Related U.S. Application Data

(60) Provisional application No. 60/722,893, filed on Sep. 30, 2005.

(51) Int. Cl.
*H01L 29/06* (2006.01)
(52) U.S. Cl. .............. 257/9; 257/E29.071; 257/E29.168
(58) Field of Classification Search ....... 257/9, E29.071, 257/E29.168
See application file for complete search history.

(56) References Cited

U.S. PATENT DOCUMENTS

| | | | |
|---|---|---|---|
| 5,793,091 A | 8/1998 | Devoe | |
| 6,597,010 B2 | 7/2003 | Eriksson et al. | |
| 6,605,822 B1 | 8/2003 | Blais et al. | |
| 6,770,916 B2 * | 8/2004 | Ohshima | 257/104 |
| 6,897,468 B2 | 5/2005 | Blais et al. | |
| 2003/0169041 A1 | 9/2003 | Coury et al. | |

OTHER PUBLICATIONS

Cirac, J.I. and P. Zoller, "Preparation of macroscopic superpositions in many-atom systems," Phys. Rev. A vol. 50 No. 4, R2799-R2802 (Oct. 1994).
Cirac, J.I. and P. Zoller, "Quantum Computations with Cold Trapped Ions," Phys. Rev. Lett. vol. 74 No. 20, 4091-4094 (May 1995).
Pellizzari, T., et al., "Decoherence, Continuous Observation, and Quantum Computing: A Cavity QED Model," Phys. Rev. Lett. vol. 75 No. 21, 3788-3791 (Nov. 1995).
Turchette, Q.A., et al., "Measurement of Conditional Phase Shifts for Quantum Logic," Phys. Rev. Lett. vol. 75 No. 25, 4710-4713 (Dec. 1995).
Hagley, E., et al., "Generation of Einstein-Podolsky-Rosen Pairs of Atoms," Phys. Rev. Lett. vol. 79 No. 1, 1-5 (Jul. 1997).
Maître, X., et al., "Quantum Memory with a Single Photon in a Cavity," Phys. Rev. Lett. vol. 79 No. 4, 769-772 (Jul. 1997).
Loss, D. and D.P. DiVincenzo, "Quantum computation with quantum dots," Phys, Rev. A vol. 57 No. 1, 120-126 (Jan. 1998).
Burkard, G., et al., "Coupled quantum dots as quantum gates," Phys. Rev. B vol. 59 No. 3, 2070-2078 (Jan. 1999).
Imamoglu, A., et al., "Quantum Information Processing Using Quantum Dot Spins and Cavity QED," Phys. Rev. Lett. vol. 83 No. 20, 4204-4207 (Nov. 1999).

(Continued)

*Primary Examiner* — Matthew Reames
(74) *Attorney, Agent, or Firm* — Bell & Manning, LLC (57) ABSTRACT

A spin bus quantum computing architecture includes a spin bus formed of multiple strongly coupled and always on qubits that define a string of spin qubits. A plurality of information bearing qubits are disposed adjacent a qubit of the spin bus. Electrodes are formed to the information bearing qubits and the spin bus qubits to allow control of the establishment and breaking of coupling between qubits to allow control of the establishment and breaking of coupling between each information bearing qubit and the spin bus qubit adjacent to it. The spin bus architecture allows rapid and reliable long-range coupling of qubits.

17 Claims, 7 Drawing Sheets

OTHER PUBLICATIONS

Barnes, C.H.W., et al., "Quantum computation using electrons trapped by surface acoustic waves," Phys. Rev. B vol. 62 No. 12, 8410-8419 (Sep. 2000).

Vrijen, Rutger, et al., "Electron-spin-resonance transistors for quantum computing in silicon-germanium heterostructures," Phys. Rev. A vol. 62, 012306-1-10 (2000).

Buisson, O. and F. Hekking, "Entangled states in a Josephson charge qubit coupled to a superconducting resonator," in *Macroscopic Quantum Computing*, edited by D.V. Averin, V. Ruggiero, and P. Silvestini (Kluwer, New York, 2001).

Marquardt, Florian and C. Bruder, "Superposition of two mesoscopically distinct quantum states: Coupling a Cooper-pair box to a large superconducting island,"'phys. Rev. B vol. 63, 054514-1-6 (Jan. 2001).

Makhlin, Yuriy, "Quantum-state engineering with Josephson-junction devices," Rev. Mod. Phys. vol. 73, 357-400 (Apr. 2001).

Al-Saidi, W.A, and D. Stroud, "Eigenstates of a small Josephson junction coupled to a resonant cavity," Phys. Rev, B vol. 65, 014512-1-7 (Dec. 2001).

Levy, Jeremy, "Quantum-information processing with ferroelectrically coupled quantum dots," Phys. Rev. A vol. 64, 052306-1-7 (2001).

Meier, Florian, et al., "Quantum Computing with Spin Cluster Qubits," Phys. Rev. Lett. vol. 90 No. 4, 047901-1-4 (Jan. 2003).

Friesen, Mark, et al., "Practical design and simulation of silicon-based quantum-dot qubits," Phys. Rev. B vol. 67, 121301-1-4 (Mar. 2003).

Blais, A., et al., "Tunable Coupling of Superconducting Qubits," Phys. Rev. Lett. vol. 90 No. 12, 127901-1-4 (Mar. 2003).

Pazy, E., et al., "Spin-based optical quantum computation via Pauli blocking in semiconductor quantum dots," Europhys. Lett. vol. 62 No. 2, 175-181 (Apr. 2003).

Yang, C.P. and Shih-I Chu, "Possible realization of entanglement, logical gates, and quantum-information transfer with superconducting quantum-interference-device qubits in cavity QED," Phys. Rev. A vol. 67, 042311-18 (Apr. 2003).

Plastina, F. and G. Falci, "Communicating Josephson qubits," Phys. Rev. B vol. 67, 224514-1-5 (Jun. 2003).

You, J.Q. and Franco Nori, "Quantum information processing with superconducting qubits in a microwave field," Phys. Rev. B vol. 68, 064509-1-7 (Aug. 2003).

Meier, F., et al., "Quantum computing with antiferromagnetic spin clusters," Phys. Rev. B vol. 68, 1 34417-1-15 (Oct. 2003).

Bose, Sougato, "Quantum Communication through an Unmodulated Spin Chain," Phys. Rev. Lett, vol. 91 No. 20, 207901-1-4 (Nov. 2003).

Vandersypen, L.M.K., et al., "Quantum Computing with Electron Spins in Quantum Dots," in *Quantum Computing and Quantum Bits in Mesoscopic Systems*, ed. A.J. Leggett, Berardo Ruggiero, Paolo Silvestrini, (Kluwer Academic/Plenum Publishers, 2004).

Sørensen, Anders S., et al., "Capacitive Coupling of Atomic Systems to Mesoscopic Conductors," Phys. Rev. Lett. vol. 92 No. 6, 063601-1-4 (Feb. 2004).

Subrahmanyam, V., "Entanglement dynamics and quantum-state transport in spin chains," Phys. Rev. A vol. 69, 034304-1-4, (Mar. 2004).

Childress, L., "Mesoscopic cavity quantum electrodynamics with quantum dots," Phys. Rev. A vol. 69, 042302-1-8 (Apr. 2004).

Christandl, Matthias, et al., "Perfect State Transfer in Quantum Spin Networks," Phys. Rev. Lett. vol. 92, No. 18. 187902-1-4 (May 2004).

Blais, Alexandre, et al., "Cavity quantum electrodynamics for superconducting electrical circuits: An architecture for quantum computation," Phys. Rev. A vol. 69, 062320-1-14 (Jul. 2004).

Wei, L.F., et al., "Coupling Josephson qubits via a current-biased information bus," preprint cond-mat/0402678 at arxiv.org/cond-mat. (Aug. 2004).

Yung, Man-Hong, et al., "A Processor Core Model for Quantum Computing," preprint cond-mat/0508165 at arxiv.org/cond-mat. (Aug. 2005).

\* cited by examiner

SPIN-BUS FOR INFORMATION TRANSFER IN QUANTUM COMPUTING

STATEMENT OF GOVERNMENT RIGHTS

This invention was made with United States government support awarded by the following agencies: ARMY DAAD 19-01-1-0515 and National Science Foundation (NSF) 0130400. The United States government has certain rights in this invention.

FIELD OF THE INVENTION

This invention pertains generally to the field of quantum computing, quantum information processing and quantum communication.

BACKGROUND OF THE INVENTION

Quantum computing utilizes quantum particles to carry out computational processes. The fundamental unit of quantum information is called a quantum bit or qubit. A qubit can be both a zero and a one at the same time. An example is the spin of an electron, wherein the up or down spin can correspond to a zero, a one, or a superposition of states in which it is both up and down at the same time. Performing a calculation using the electron essentially performs the operation simultaneously for both a zero and a one. Experimental advances in quantum computation have come most rapidly in nuclear magnetic resonance (NMR) and ion-trap systems. The success of few-qubit quantum computation in such systems demonstrates an urgent need for a quantum computing scheme that is scaleable to a large number of qubits. Solid-state qubits are one of the primary candidates. Numerous proposals have been made for solid-state quantum computers. These proposals include the use of nuclear spins as qubits, B. E. Kane, "A Silicon-Based Nuclear Spin Quantum Computer," Nature, Vol. 393 (6681), (1998), pp. 133-137; and the use of electronic spins as quantum dots, DiVincenzo, et al., "Quantum Computers and Quantum Coherence," J. of Magnetism and Magnetic Materials, Vol. 200, (1-3), 1999, pp. 202-218. Potential issues with such proposed systems include individual impurity spins, as well as gate operation and readout methods for the quantum dots.

Spins can be manipulated using a strong DC magnetic field combined with a radio frequency field (e.g., at GHz frequencies). In the presence of a small g-factor gradient, the spins can be addressed individually. Entanglement of one spin with another proceeds by gating the barrier between spins. This gives rise to a time-dependent exchange interaction, $H(t)=J(t)S_1S_2$. A combination of these operations acting in the proper sequence on two qubits will produce a controlled-NOT gate (C-NOT). See, e.g., R. Vrijen, et al., "Electron-Spin Resonance Transistors for Quantum Computing in Silicon-Germanium Heterostructures," Physical Review A, Atomic, Molecular, and Optical Physics, Vol. 62(1), 2000, pp. 012306/1-10.

Quantum dot architectures have been developed specifically for the purpose of manipulating electron spins for fast and accurate two-qubit operations that serve as universal gates for quantum computations. M. Friesen, et al., Phys. Rev. B 67, 121301-1-4 (2003). See, also, U.S. Pat. No. 6,597,010. Recent experimental results have shown that decoherence does not pose a fundamental problem for such gate operations. A. M. Tyryshkin, et al., Phys. Rev. B 68, 193207 (2003). Using special qubit geometries as discussed in M. Friesen, et al., Appl. Phys. Lett. 81, 4619 (2002), it should be possible to perform reliable gate operations in silicon quantum dots at rates between about 1 MHz and 1 GHz.

In a quantum computer, qubits are usually stored in physical devices that are localized, and qubit gating often involves local interactions. For example, the gating of spin-based qubits conventionally involves only nearest neighbors. D. Loss, et al., "Quantum Computation with Quantum Dots," Phys. Rev. A 57, 120-126 (1998). Conceptually, it is possible to implement quantum gates between any pair of distant qubits by using enough intermediate SWAP gates to bring the qubits into proximity. See, M. A. Nielson and L. I. Chuang, *Quantum Computation and Quantum Information*, Cambridge University Press, 2000. While such procedures would not affect the exponential nature of algorithmic speedup for prime factorization, they could be detrimental for algorithms with sub-exponential speedup. In particular, because of the nested structure of fault-tolerant algorithms, the absence of long-range couplings could be catastrophic, effectively putting error correction out of reach.

In several proposed quantum computing architectures, the problem of short-range interactions is overcome by means of a so called bus mode—a quantum coherent mode extending across the entire device. In principle, different qubits can be coupled to one another via the bus mode. Because of the extended nature of the bus, the proximity of the interacting qubits becomes irrelevant. The bus mode circumvents the need for multiple, local SWAP operations, thus improving the prospects for scalability and fault-tolerance. However, because of the physical extent of the bus, these modes have a tendency to couple more strongly to the environment than localized qubits, with a consequent effect on bus decoherence. Additionally, it often is the case that bus modes couple rather weakly to the qubits, causing a decrease in the bus speed. Quantum computing architectures based on bus modes have been proposed for various physical systems, including trapped ions, where the bus is formed by the phonon modes of a linear array of coupled ions, and solid-state implementations including discrete LC circuits, large Josephson junctions, three-dimensional cavities, grain-boundary phase qubits, and one-dimensional transmission line resonators. Another solid-state quantum computing implementation which has received considerable attention utilizes quantum dots containing a small, fixed number of electrons. Because of the technological infrastructure built around semiconductors, and the attractive decoherence properties of spins in quantum dots, such systems hold promise of highly scalable quantum computing. D. Loss, et al., (1998) supra. However, viable bus architectures for such quantum dot solid-state systems have been difficult to achieve because of the lack of viable bus schemes that are technologically compatible with semiconductor heterostructures. Imamoglu, et al., "Quantum Information Processing Using Quantum Dot Spins and Cavity QED," Phys. Rev. Lett., 83, 4204-4207 (1999), developed a bus scheme in which spins in self-assembled dots are made to interact in a high-Q cavity by means of laser excited Raman transitions. Unfortunately, the physical realization of this scheme has apparently not been achieved, in part because this approach requires precisely positioned lasers that are extremely difficult to realize experimentally. More recently, it has been proposed to couple spin qubits via a high-Q superconducting transmission line. L. Childress, et al., "Mesoscopic Cavity Quantum Electrodynamics with Quantum Dots," Phys. Rev. A, vol. 69, pp. 042302-1-8 (2004). Using far off-resonant microwave Raman transitions, the spins can be excited into virtual charge states that interact via the bus. The decoherence problems that normally plague charge-based qubits are reduced in this scheme, due to the detuning of the Raman transitions. However, detuning also considerably reduces the speed of information transfer. Consequently, long-range coupling remains among the chief architectural challenges for scalable spin-based quantum computing.

SUMMARY OF THE INVENTION

The spin bus architecture of the present invention enables rapid and reliable long-range coupling of quantum bits, or "qubits". The use of the bus in accordance with the invention does not require cavities, microwaves, or local optics. Importantly, the term "spin" is broadly defined for the purposes of this disclosure to refer to any quantum object whose interactions with other such objects is of the exchange type. As such, the terms "spin" should be understood to include systems, such as electron-on-helium, that are sometimes referred to in the art as "pseudo-spins." Thus, in the description which follows, phrases such as "spin bus," "spin interactions," "spin channel," and the like, should not be interpreted literally to include only buses, interactions, channels, etc. that involve electron spins, but should be interpreted to include buses, interactions, channels, etc., that involve any quantum object whose interactions with other such objects is of the exchange type.

The spin bus is formed of a large clustered qubit or spin chain, with interactions between the individual spins being strong and always on. The ground-state manifold of the spin cluster is doubly degenerate and desirably has an excitation gap that is as large as possible. One spin bus design which meets these criteria is composed of is an electron spin bus having an odd number of spins, wherein the couplings between the spins in the chain are equal or substantially equal. In the case where the "spin" cluster actually comprises an electron spin cluster, has a total spin-½, as in a conventional spin qubit. Other designs are possible, however. For example the spin bus may the spin bus may have an even number of spins with specially chosen couplings between the qubits in the chain. Relevant considerations, as they apply to a spin bus having a ring configuration are discussed in Meier et al., Phys. Rev. B, vol. 68, pp. 134417-1-15 (2003), the entire disclosure of which is incorporated herein by reference.

The effective spin of the bus interacts with other spins or cluster qubits via exchange coupling. Because information is transmitted on the bus through the spin channel, the information is largely decoupled from its charge environment, providing excellent decoherence properties. In the spin bus quantum computing (QC) architecture in accordance with the invention, only one or at most a few very large clusters are used to form a bus, while the working qubits are comprised of individual qubits or much smaller clusters. A qubit can couple to any individual spin in the bus, as compared to cluster schemes wherein only spins at the ends of the clusters are used to couple the other clusters. In the spin bus of the invention, the spins in the bus are strongly coupled to maximize the bus speed, and the coupling is always on. The bus is not intended to store information other than for the short time required to transmit the information from source to destination. Sectors on the spin bus may be defined in which qubits storing information are coupled to the bus such that information can be transmitted to or received from the bus to communicate with a readout sector at a remote location on the bus which allows a readout of the information to conventional electronic circuits.

In one embodiment the spin bus QC architecture of the invention includes a spin bus formed of multiple strongly coupled and always on quantum dots that define a string of spin quantum dots. A plurality of information bearing qubits are formed as quantum dots with each qubit adjacent a quantum dot of the spin bus. Electrodes are formed adjacent to the information bearing qubits and the spin bus quantum dots to allow control of the establishment and breaking of coupling between each information bearing qubit and the spin bus quantum dot adjacent to it.

The QC architecture may be formed in a multi-layer semiconductor structure which includes a bottom semiconductor layer, a top semiconductor layer, and an intermediate quantum well layer in which the quantum dots are defined. The top and bottom layers may be formed of, e.g., SiGe, and the intermediate quantum well layer may be formed of Si, it being understood that the invention may be implemented in any other suitable semiconductor material system. The invention is not limited to such multi-layer quantum well structures. For example only, the invention may be implemented in a silicon-germanium multi-layer structure in which electrons are trapped on phosphorus ions implanted into a silicon-geranium matrix, with control of the coupling of the qubits to the spin bus implemented with the top gate electrodes. The invention is also not limited to implementation in semiconductor systems. For example, the qubits may be defined in a electrons floating above a substrate of superfluid helium wherein the electrons are trapped laterally by metal electrodes for the bus and the qubits, with coupling between the qubits and the spin bus controlled by the electrodes.

Further objects, features and advantages of the invention will be apparent from the following detailed description when taken into conjunction with the accompanying drawings.

DETAILED DESCRIPTION OF THE INVENTION

Figure 1:
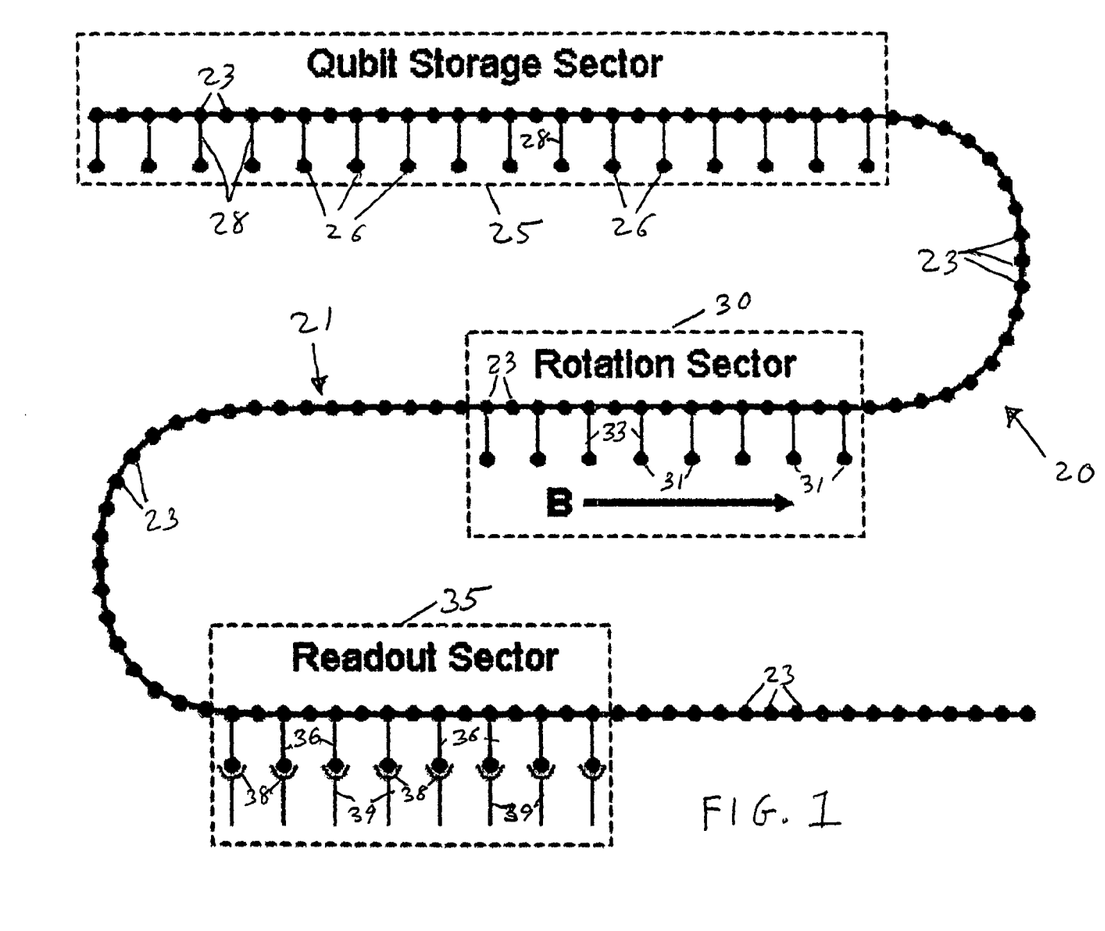
FIG. 1 is a simplified plan view of a spin bus QC architecture in accordance with the invention.
Figure 2:
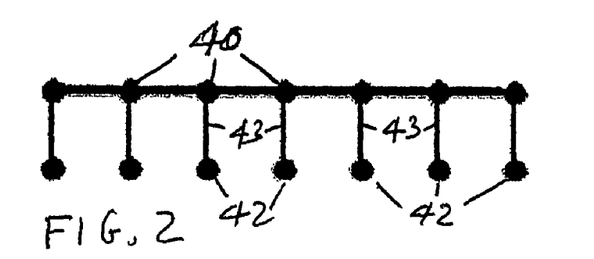
FIG. 2 is a simplified illustrative view of a basic spin bus having a single string of spins.

A simplified view of a spin-bus QC architecture in accordance with the invention is shown generally at 20 in FIG. 1. The QC architecture 20 may be implemented in semiconductors as well as other structures as discussed further below. The QC architecture 20 includes a main spin bus 21 formed of a string of qubits (i.e., the "bus qubits", e.g., quantum dots) 23 which are always on and which are strongly coupled together. Information bearing working qubits can be selectively coupled to the qubits of the bus to receive information from or provide information thereto. For purposes of illustration, the spin bus QC architecture 20 includes a qubit storage sector 25 having a series of qubits 26 which are coupled to the bus 21 by couplings 28 which can be turned on and off electronically. A rotation sector 30 has qubits 31 which are selectively coupled to the spin bus 21 by couplings 33 which can be turned on and off electronically and which can be affected by a magnetic field applied from a magnetic field source as illustrated by the directional line B shown in FIG. 1. The spin bus QC architecture further includes a readout sector 35 having one or more qubits selectively coupled to the spin bus by one or more couplings 36 that can be turned on and off electronically, with one or more readout devices 38 coupled to the qubits to provide readout information on one or more lines 39 in the form of conventional electrical signals. The use of a plurality of qubits in the readout sector, as shown in FIG. 1, is advantageous because it enables parallel operation thereby increasing the readout speed of the device. The readout may be carried out, for example only, utilizing spin-charge transduction combined with sensitive charge or current detection. A preferred spin readout implementation is described in M. Friesen, et al., "Spin Readout and Initialization in a Semiconductor Quantum Dot," Phys. Rev. Lett. 92, 37901-1-4 (2004). For two-qubit gates, the source qubit is SWAPed onto the bus 21, coupled with the target qubit, then SWAPed back to the source qubit, leaving the bus in its original state. In this mode, all data passes through the bus, and scalable operations are directly related to the bus speed. Since the spin qubits 23 in the bus are strongly coupled, the time needed for gate operations between distant qubits is comparable to the nearest neighbor coupling in conventional spin architectures.

In a manner analogous to the initialization of a single-spin qubit or a spin cluster, a spin-bus comprising a string of qubits composed of electron spins can be initialized by thermalizing in a DC magnetic field. The temperature criterion for this process is given by $k_B T \ll g\mu_B B_z \ll \Delta \sim J_b \pi^2 / 2 N_b$, where $\Delta$ is the energy splitting between the ground-state doublet of the bus $\{|\uparrow_b\rangle, |\downarrow_b\rangle\}$ and the excited spin states, and $J_b$ is the exchange coupling between spins within the bus. It is desirable to maximize $J_b$ for a physically realistic spin-bus. For $J_b$ on the order of 5 meV, and a scalable system size of $N_b \cong 10^3$ bus spins, $\Delta \sim 25 \mu eV \cong 0.3$ K. This does not pose a severe thermal constraint for initialization. However, the thermalization process is relatively slow (on the order of $T_1$), due to the weak coupling between spins and their environment. Thus, thermalization is only useful for the first bus initialization (i.e., prior to initiating the quantum algorithm)

"Leakage" errors may occur during spin-bus operation as a result of non-adiabatic gating. This occurs when undesired spin modes are excited in the bus, due to the implementation of bus gates (e.g., SWAPs) at speeds comparable to or greater than $\Delta/h$. The decreasing size of the excitation gap $\Delta$ as a function of the bus size $N_b$, combined with the frequent operation of the bus near its adiabatic limit, suggests that leakage errors will be inevitable. A fast bus reset protocol is thus desirable. Such protocols may utilize qubits as a resource, since there exist fast schemes for resetting or "cooling" qubits. For example, fast measurement is sufficient for qubit initialization. See M. Friesen, et al., "Spin Readout and Initialization in a Semiconductor Quantum Dot," Phys. Rev. Lett. 92, 37901-1-4 (2004). By SWAPing cooled qubits onto the bus at appropriate nodes, the bus can also be cooled to its ground state (i.e., reinitialized), with an accuracy that depends on the number of SWAPs.

Figure 3:
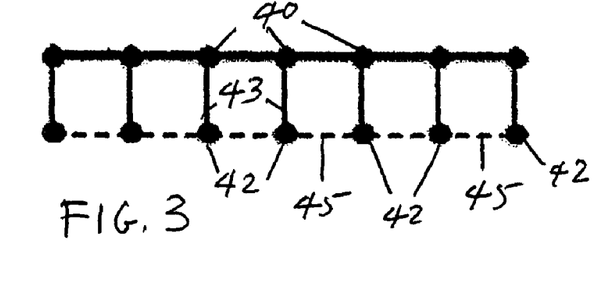
FIG. 3 is a simplified illustrative view of a spin bus having qubits that are coupled to each other as well as to the spin bus.
Figure 4:
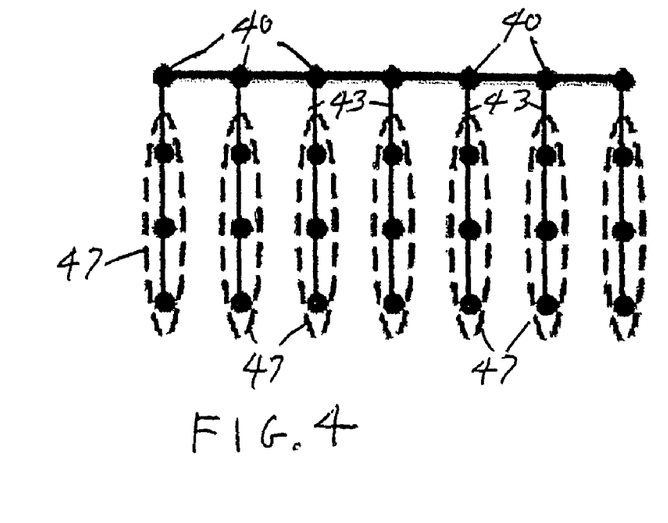
FIG. 4 is a simplified illustrative view of a spin bus architecture in which the spin quantum dots are coupled to clusters containing multiple qubits.
Figure 5:
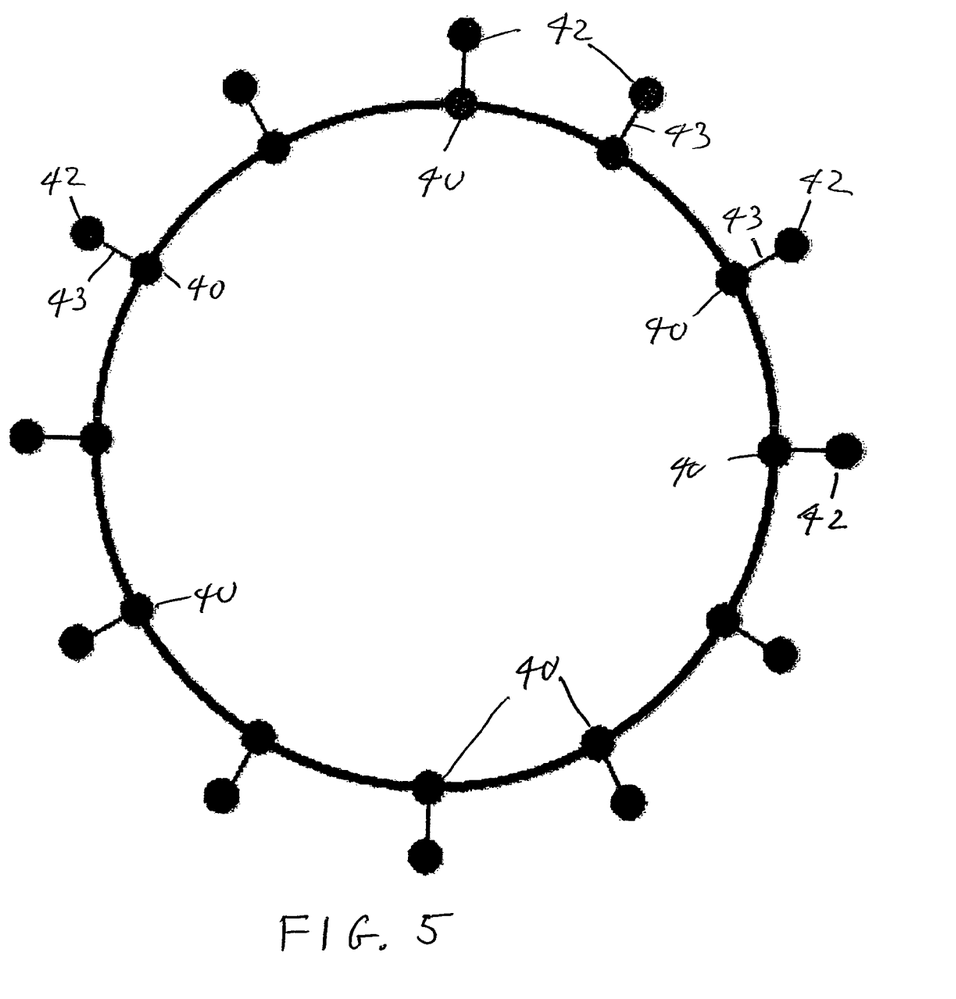
FIG. 5 is a simplified illustrative view of a spin bus architecture in which the spin bus forms a closed ring.

FIGS. 2-5 illustrate the basic types of spin bus qubit couplings that may be utilized in accordance with the invention. In the basic spin bus of FIG. 2, a single string of qubits is formed such that the spins 40 are strongly coupled to each other at all times, and information bearing qubits 42 are selectively coupled to the spins 40 via electronically controllable couplings 43. Each information bearing qubit is selectively coupled to one spin 40 in the bus. In the architecture of FIG. 3, the information bearing qubits 42 are also coupled to each other via electronically controllable couplings 45 as well as being coupled to the spin bus. In the architecture of FIG. 4, the spins 40 are coupled to clusters 47 containing multiple qubits. The QC architectures of FIGS. 3 and 4 allow both long range and parallel gate operations. In the architecture of FIG. 5, the spin bus is formed as a continuous ring of spins 40 in which each spin is coupled strongly to two neighbors. The ring may be of any closed geometric shape.

The interactions used in the present invention to couple neighboring spins belong to a class of couplings known as exchange couplings. Heisenberg coupling is an example of one a special case of exchange coupling. Specifically, the Heisenberg interaction is the isotropic case of the exchange coupling. As noted above, the term "spin" is defined broadly for the purposes of this disclosure. Thus, any physical system of qubits falling into the exchange coupling class can form a "spin" bus, including systems without spins. As an illustration of a specific implementation of the invention, qubits are formed in single electron or few electron quantum dots in a silicon-based semiconductor structure as illustrated at 50 in FIG. 6. The electron spin forms the qubits for the bus quantum dots 51 and the information bearing qubit dots 52. The exemplary structure 50 shown in FIG. 6 includes a bottom layer 55 of $Si_{0.7}Ge_{0.3}$, an intermediate quantum well layer 56 of Si, and a top layer 57 of $Si_{0.7}Ge_{0.3}$, with electrons confined in the quantum well layer 56. The semiconductor substrate is not shown for simplicity of illustration.

Figure 6:
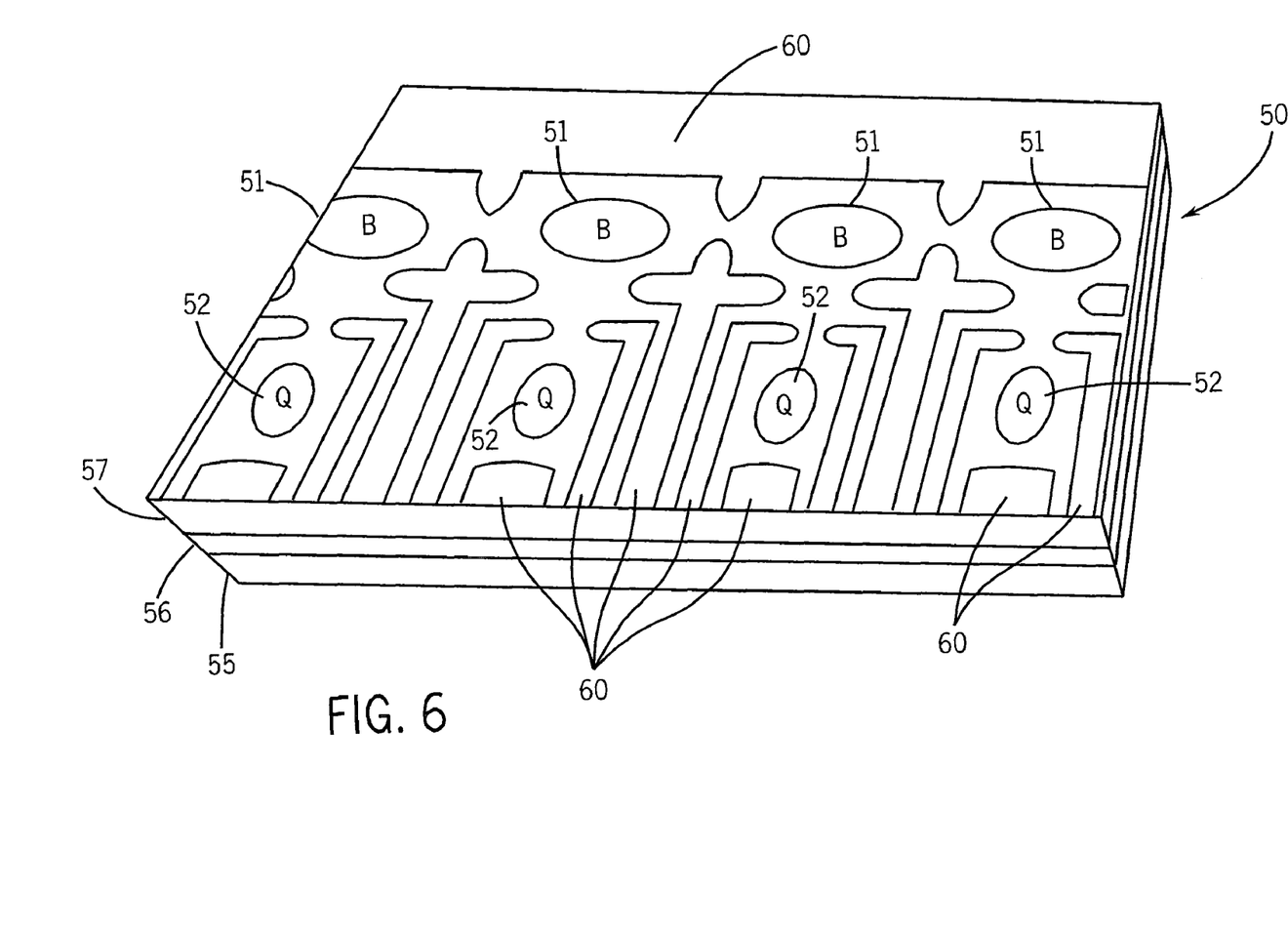
FIG. 6 is a partial perspective and a cross-sectional view of an implementation of the invention in which qubits are formed in a silicon-based semiconductor structure.

Lateral confinement of the electrons in the structure of FIG. 6 is provided by electrostatic top gate electrodes 60, which may be formed as metal gate structures lithographically patterned on the top semiconductor layer 57. Independent control of the voltage on the various top gate electrodes 60 enables electrostatic definition of the quantum dots. Confinement may also be obtained by etch confinement, in which the dots 51 and 52 and/or control gates are defined by chemical etching of the semiconductor layers to achieve the desired geometry. The same gates that define the quantum dots may also be used to control the qubits. Two-qubit gates are implemented by lowering the electrostatic barrier between the qubits, thus allowing their wave functions to overlap. The quantum dots used for the spin-bus and for conventional qubits are essentially identical and no special material requirements are necessary for implementing the spin bus. A more detailed description of the formation of solid-state quantum dots in semiconductor systems is provided in U.S. Pat. No. 6,597,010, entitled "Solid-State Quantum Dot Devices and Quantum Computing Using Nanostructure Logic Gates," the disclosure of which is incorporated herein by reference. Other material systems may also be utilized. Such other material systems include, but are not limited to, $Al_{0.3}Ga_{0.7}As/GaAs/Al_{0.3}Ga_{0.7}As$, and $GaAs/Al_{0.3}Ga_{0.7}As$.

Figure 9:
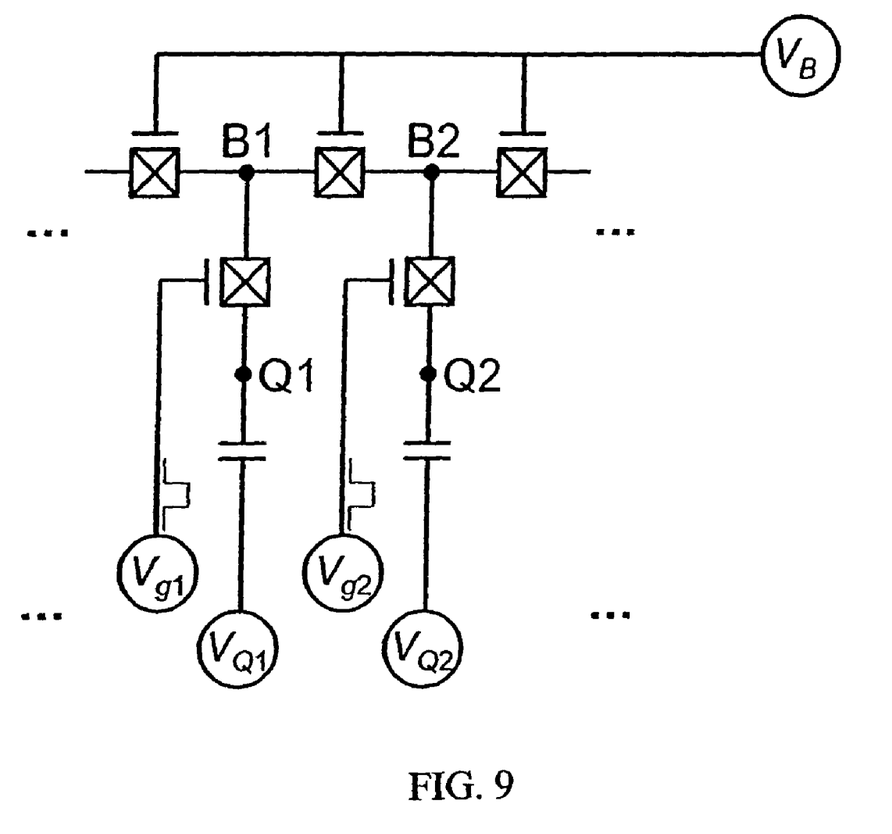
FIG. 9 is a circuit diagram for the four quantum dots (two bus and two qubit) shown in the central part of the gate layout of the structure shown in FIG. 6.

A circuit diagram suitable for the four quantum dots (two bus and two qubits) shown in the central part of the gate layout in FIG. 6 is provided in FIG. 9. In FIG. 9, the square box elements correspond to tunnel barriers with capacitive couplings which may be controlled by external voltage supplies. Using the depicted circuit, device operation is achieved by pushing the gate voltages, $V_{g1}$ and $V_{g2}$, to raise and lower the tunnel barriers between the bus electrons and the qubit electrons.

Figure 7:
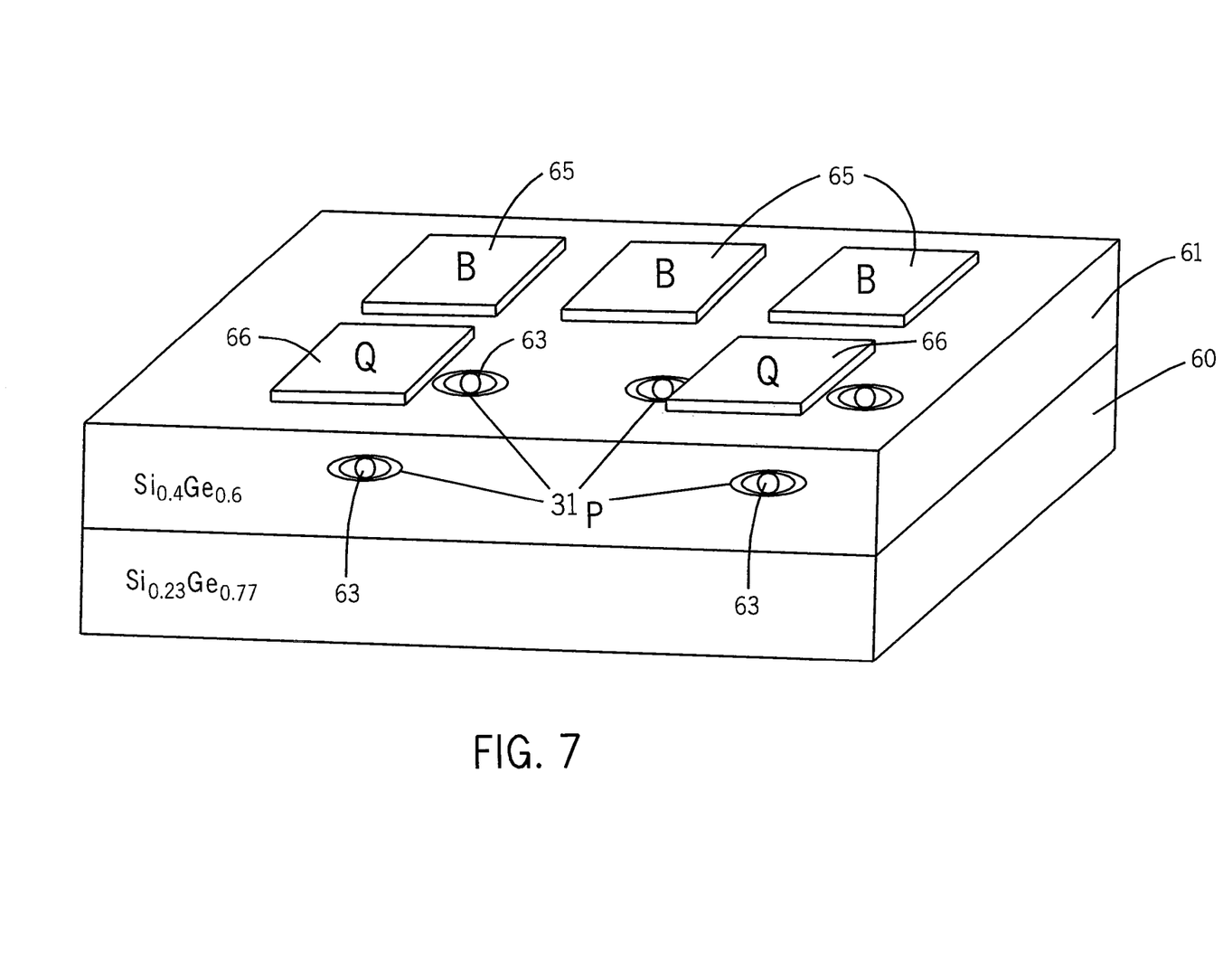
FIG. 7 is a partial perspective and cross-sectional view of an implementation of the invention in which qubits are formed by trapping of ions in a matrix of semiconductor.

Electrons can be trapped in other structures besides quantum dots. For example, electrons can be trapped on donor ions embedded within a semiconductor heterostructure. An example of this structure is shown in FIG. 7, which includes a first layer 60 of silicon-germanium and a second layer 61 of silicon-germanium, with the two layers possibly having different compositions. Additional functional layers are not shown for simplicity. Electrons are trapped at locations 63 on $^{31}$P ions implanted into the silicon germanium matrix as illustrated in FIG. 7. The electrons are bound to the P ions, which are aligned directly below metal top gates 65 for the bus and metal top gates 66 for the qubits. The intra-bus couplings (B-B) are strong and always on. In a manner similar to the arrangement in quantum dots, the electrons are controlled by the metal top gate electrodes 65 and 66, which are lithographically patterned on the semiconductor surface. By manipulating the electrons with the top gates, the wave functions of the electrons are made to overlap in a manner analogous with quantum dots.

Figure 8:
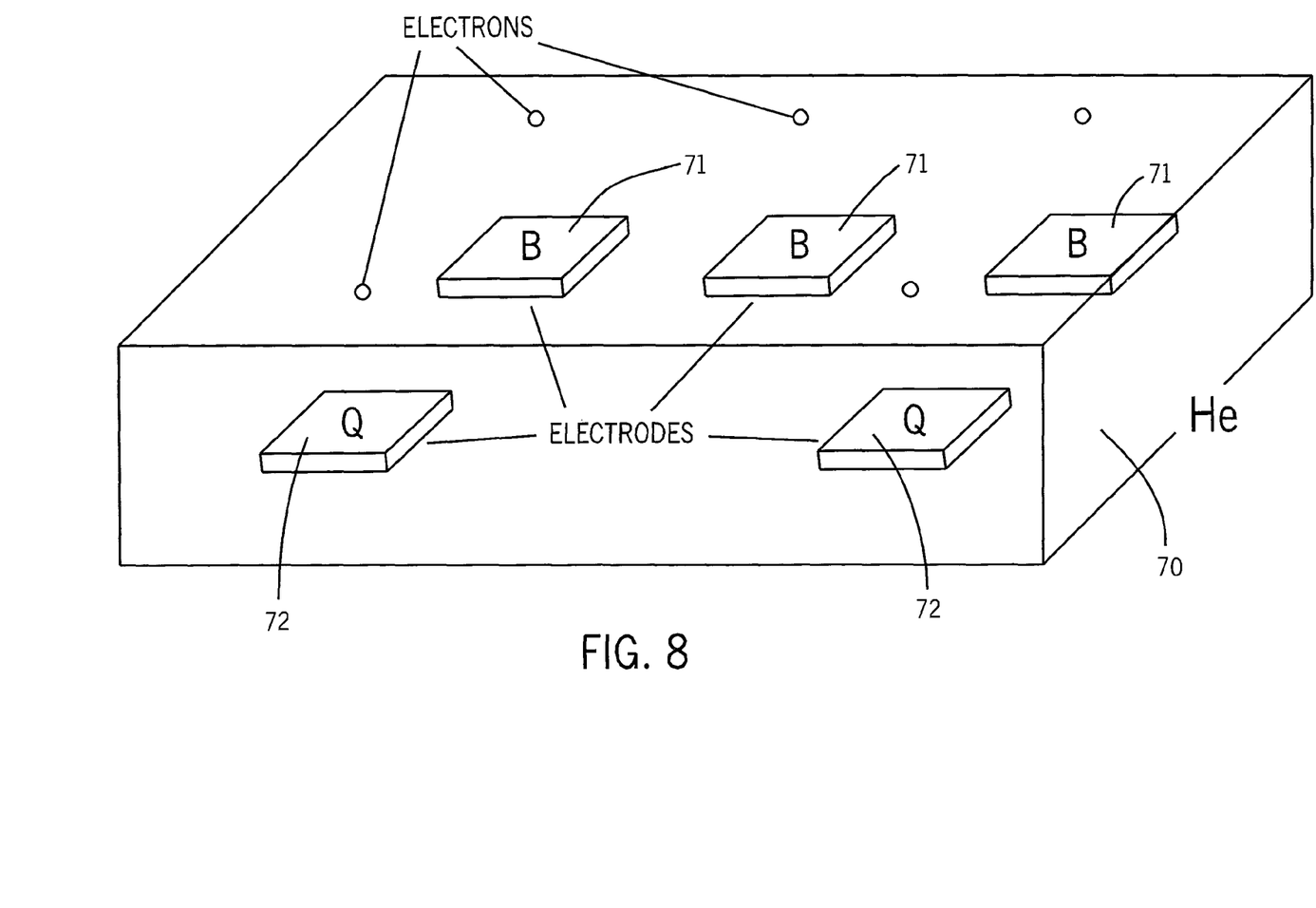
FIG. 8 is a partially perspective and cross-sectional view of an implementation of the invention in which the qubits are defined by electrons floating above a helium substrate.

In an alternative embodiment, the qubit are composed of excited energy states of an electron, rather than electron spins. For example, electrons floating above a substrate of super fluid or liquid helium can also form qubits. Qubits of these types are described in U.S. Patent Application Publication No. 2003/0169041 and in Science, vol. 284, p. 1967 (1999), the entire disclosures of which are incorporated herein by reference. In these qubits, the electrons are trapped vertically by their own image charges within the liquid helium as illustrated at 70 in FIG. 8. The electrons may be trapped laterally by metal posts or electrodes 71 for the bus and 72 for the qubits. The electrons are manipulated electrostatically, in a manner analogous to solid-state systems. The intra-bus couplings (B-B) are of the XXZ type and are strong and always on. In this embodiment, the qubit is not the electron spin, but rather the excited energy states of the electron in the potential well of its image. The corresponding electron-electron interactions are not of the Heisenberg type but rather the coupling is an anisotropic exchange type, called XXZ. The same bus-qubit architecture developed for solid-state systems as described above is applicable. Other charge qubit systems that utilize exchange coupling (e.g., Heisenberg, XXZ or XY type couplings) can be utilized, including quantum dot charge qubits and superconducting Cooper pair boxes. Descriptions of these types of qubits may be found in Phys. Rev. Lett., vol. 74, p. 4083 (1995) and Rev. Mod. Phys., vol. 73, p. 357 (2001), the entire disclosures of which are incorporated herein by reference.

It is understood that the invention is not confined to the particular embodiments set forth herein as illustrative, but embraces all such forms thereof as come within the scope of the following claims.

What is claimed is:

1. A spin bus QC architecture comprising:
   (a) a bus formed of multiple bus qubits extending in a string;
   (b) multiple information bearing qubits, each information bearing qubit formed adjacent to a bus qubit;
   (c) a first set of electrodes formed adjacent to the bus qubits and electronically coupled to a voltage supply, wherein the bus qubits, the first set of electrodes and the voltage supply are configured to turn on exchange interactions between each bus qubit and each of its neighboring bus qubits simultaneously; and
   (d) a second set of electrodes formed adjacent to the information bearing qubits and electronically coupled to a voltage supply, wherein the information bearing qubits, the second set of electrodes and the voltage supply are configured to selectively control the establishment and breaking of the exchange coupling between each information bearing qubit and the bus qubit adjacent to it, such that the spin bus QC architecture is configured to provide operations by turning exchange couplings between the information bearing qubits and their adjacent bus qubits on and off, while keeping the exchange couplings between each of the bus qubits and its neighboring bus qubits always on.

2. The bus QC architecture of claim 1 including a plurality of information bearing qubits defining a qubit storage sector and at least one read-out qubit in a read-out sector coupled to the bus at a position on the bus remote from the qubit storage sector.

3. The bus QC architecture of claim 2 further including a plurality of qubits coupled to the bus to form a rotation sector spaced from the qubit storage sector and the read-out sector.

4. The bus QC architecture of claim 1 wherein the bus qubits and the information bearing qubits comprise electron spins.

5. The bus QC architecture of claim 4 wherein the bus qubits and the information bearing qubits comprise quantum dots.

6. The bus QC architecture of claim 5 wherein the bus and the information bearing qubits are formed on a multi-layer semiconductor structure including a bottom semiconductor layer, a top semiconductor layer, and an intermediate quantum well layer comprising electrons confined in a plurality of quantum wells, and further wherein the electrodes comprise gates formed on the top semiconductor layer.

7. The bus QC architecture of claim 6 wherein the top and bottom semiconductor layers are formed of SiGe and the intermediate quantum well layer is formed of Si.

8. The bus QC architecture of claim 4 wherein the electrons are trapped on donor ions embedded within a semiconductor heterostructure.

9. The bus QC architecture of claim 8 wherein the information bearing qubits and the bus are formed in multiple layers of SiGe matrix of differing composition and further wherein electrons are trapped by phosphorus ions implanted in the silicon-geranium matrix, wherein the electrodes comprise gates formed on the multi-layer structure.

10. The bus QC architecture of claim 1 wherein the bus qubits and information bearing qubits comprise excited energy states of an electron.

11. The spin bus QC architecture of claim 10 wherein the bus qubits and information bearing qubits are formed of electrons floating above a helium substrate.

12. The spin bus QC architecture of claim 1 wherein the exchange coupling comprises Heisenberg type exchange coupling.

13. The spin bus QC architecture of claim 1 wherein the exchange coupling comprises XXZ type exchange coupling.

14. The spin bus QC architecture of claim 1 wherein the spin bus comprises three bus qubits.

15. The spin bus QC architecture of claim 1 wherein the spin bus comprises seven bus qubits.

16. The spin bus QC architecture of claim 1 wherein the spin bus forms a closed ring of bus qubits.

17. The spin bus QC architecture of claim 1 wherein information bearing qubits are configured to undergo exchange coupling with bus qubits that are not at the ends of the bus.

\* \* \* \* \*